Figure 1:
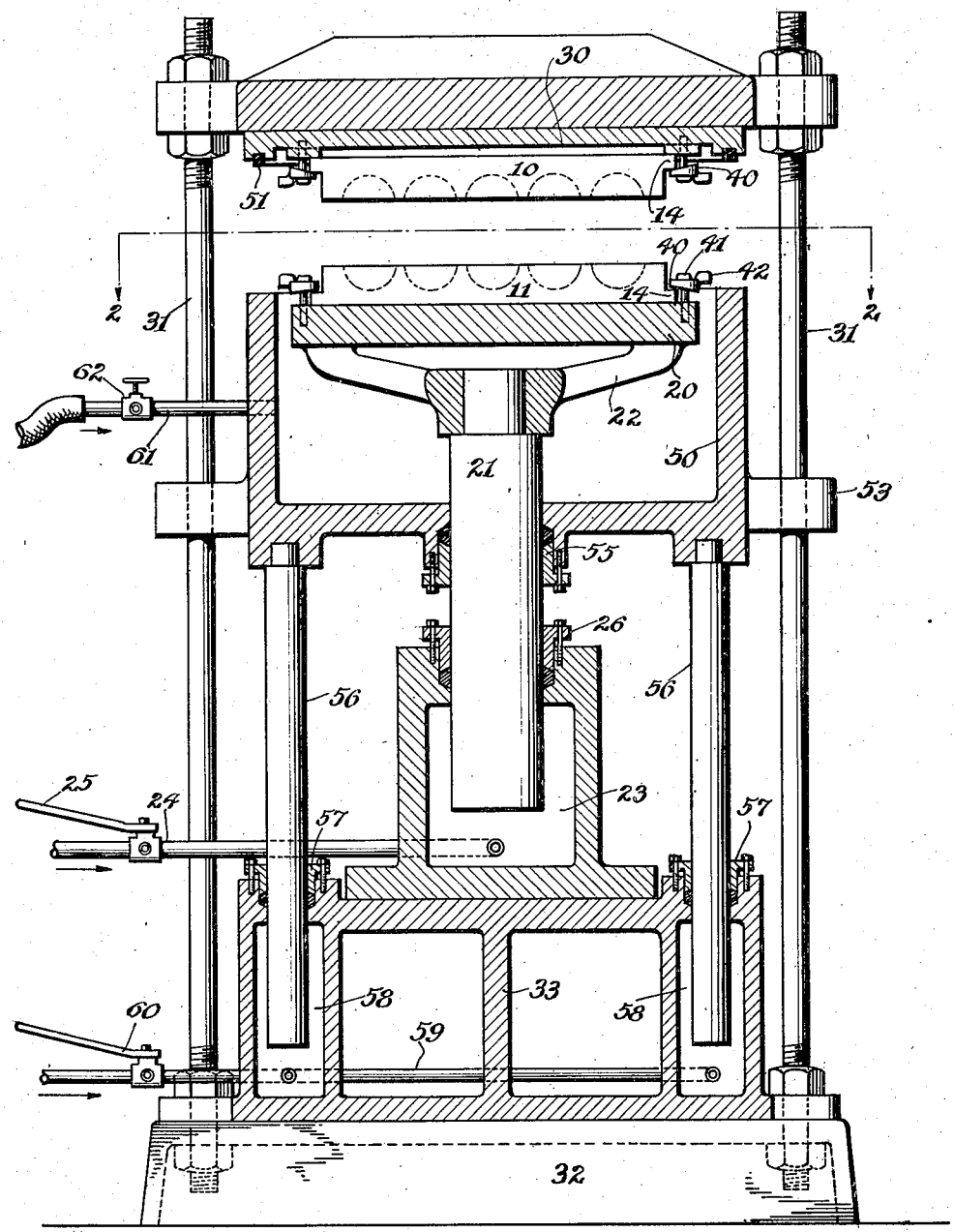

F. T. ROBERTS.
PROCESS OF AND APPARATUS FOR REMOVING INFLATED ARTICLES FROM MOLDS.
APPLICATION FILED MAR. 6, 1916.

1,201,627.

Patented Oct. 17, 1916.
2 SHEETS—SHEET 1.

INVENTOR,
Fred Thomas Roberts,
BY Albert H. Bates,
ATTY

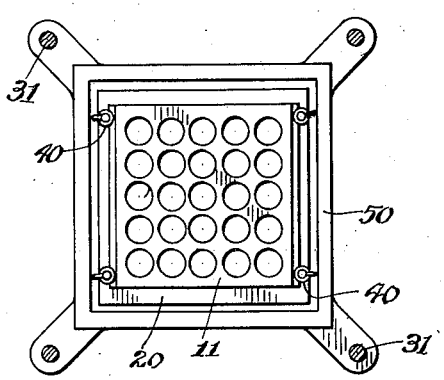
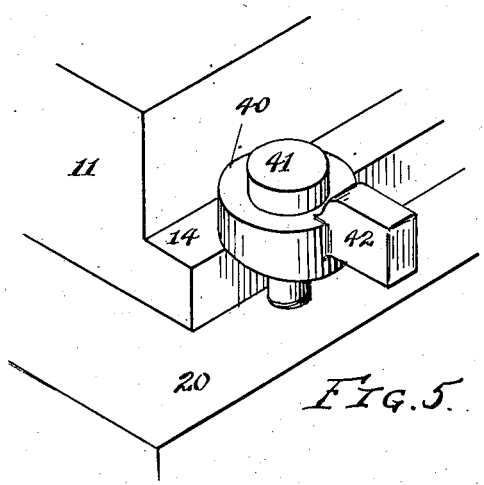
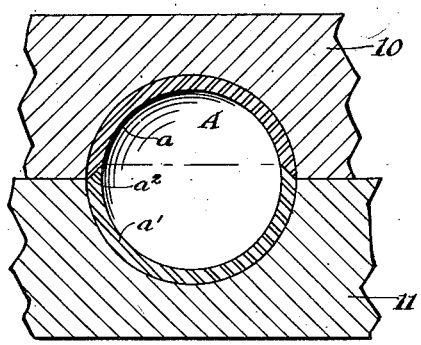
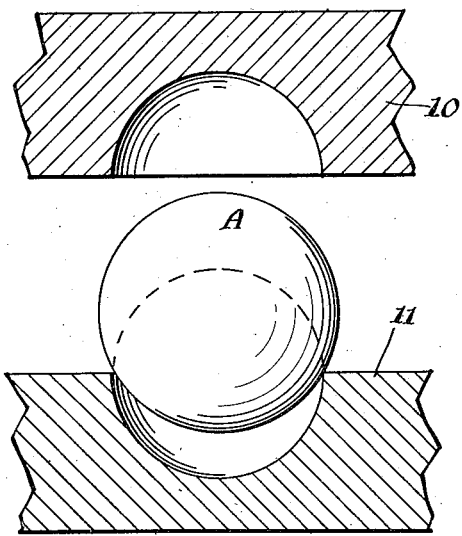
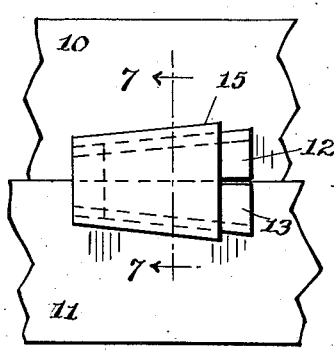
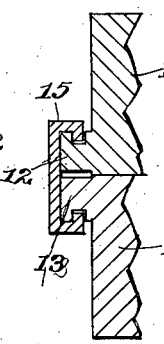

UNITED STATES PATENT OFFICE.

FRED THOMAS ROBERTS, OF CLEVELAND, OHIO, ASSIGNOR TO THE ARANAR COMPANY, OF CLEVELAND, OHIO, A CORPORATION OF OHIO.

PROCESS OF AND APPARATUS FOR REMOVING INFLATED ARTICLES FROM MOLDS.

1,201,627.   Specification of Letters Patent.   Patented Oct. 17, 1916.

Application filed March 6, 1916. Serial No. 82,272.

*To all whom it may concern:*

Be it known that I, FRED THOMAS ROBERTS, a citizen of the United States, residing at Cleveland, in the county of Cuyahoga and State of Ohio, have invented a certain new and useful Improvement in Processes of and Apparatus for Removing Inflated Articles from Molds, of which the following is a full, clear, and exact description, reference being had to the accompanying drawings.

This invention is concerned with an improvement in the manufacture of hollow inflated articles, as for example, rubber balls. When such articles are made within cavities in a pair of separable mold members, an internal pressure being supplied to the article while in the mold, several difficulties have developed in releasing and removing the finished article. Thus, as the mold members are separated, the elastic wall of the article sometimes allows the internal pressure to bulge the article into the space between the molds, distorting and straining it. If any exposed portion is materially weaker than the rest of the wall the bulging pressure becomes concentrated at that point and may even result in a "blow-out." Furthermore, the clinging of the articles to the mold plates throws a strain on them when the plates are separated, and when the plates have become completely separated some of the articles are liable to remain in one mold plate and others in the other mold plate, interfering with rapid and easy removal of the articles.

The object of the present invention is to provide for the release of the articles from their molds without subjecting them to strain and enable their removal in a rapid and efficient manner. I accomplish this by supplying a fluid under pressure which enters the space between the mold members just as they are separated, and not only prevents the outward bulging of the articles but by counteracting their own internal pressure reduces them in size so that they lie loosely in their respective cavities in the lower mold member. This counteracting pressure is then reduced, with the result that the articles by reëxpanding lift themselves substantially free from their cavities, resting lightly therein in a position to be easily removed. This latter feature is particularly valuable in using mold plates having a large number of cavities.

The invention is concerned both with the process referred to of removing inflated articles from molds and with a convenient apparatus I have devised for carrying out the process, all of which will be hereinafter more fully described.

The drawings show a convenient apparatus of my invention for carrying out the process, and thus illustrate that process.

In these drawings Figure 1 is a sectional side elevation of a suitable press adapted to hold the mold plates together and surround them with an atmosphere of fluid under pressure and separate them in this atmosphere; Fig. 2 is a plan of the lower mold plate in place, being substantially a horizontal section on the line 2—2 of Fig. 1; Fig. 3 is a cross section through the mold plates when contiguous, showing a completed inflated rubber ball; Fig. 4 is a similar view of the mold plates after separation, illustrating the enlargement of the ball; Fig. 5 is a perspective view of one of the clamps for holding the mold plates in position in the press; Figs. 6 and 7 are respectively a side elevation and a vertical cross section of a wedge clamp adapted to hold the two mold plates to each other.

Fig. 1 shows a pair of mold plates designated 10 and 11 respectively, each of which is provided with numerous cavities, the cavities coöperating to confine the articles to be molded. Fig. 2 shows, on a reduced scale, the lower mold plate 11. As illustrated in these views each plate has twenty-five cavities of hemispherical form, for the manufacture of twenty-five hollow rubber balls. It is to be understood that the number of cavities, their arrangement on the plate, and the shape of the cavities may be varied as desired. Such mold plates are adapted to have recessed or cup-shaped portions of rubber seated in their cavities, these cup-shaped portions being brought together to make closed articles to which a suitable internal pressure is supplied. This internal pressure may be provided by some expanding chemical put into the sections before they are brought together, or the sections may be brought together within an atmosphere of compressed fluid, as illustrated and claimed in my Patent No. 1,146,523. The articles, expanded against the walls of their cavities are usually vulcanized within the mold plates.

As stated, the present invention is concerned with the removal of the articles from their mold cavities. We will accordingly assume that the mold plates 10 and 11 are held together by suitable means and have within them a set of vulcanized inflated rubber articles, balls for example. Figs. 6 and 7 show suitable means for so holding the mold plates together, consisting of wedge-shaped clamps 15, which overhang and occupy grooves in wedge-shaped ribs 12 and 13 on the mold plates. These clamping devices, provided on opposite edges of the mold plates, may firmly hold them together. The particular mechanism which I will now describe may take such plates and cause their ready separation without injury to the articles, and result in the articles being released from their cavities.

Referring now to Fig. 1, 20 indicates a platen on a suitable hydraulic press, this platen being mounted (by means of spider-arms 22) on the upper end of a plunger 21, which operates through a stuffing box 26, into a cylinder 23 supplied with pressure fluid through a pipe 24 under the control of a valve 25. A coacting stationary platen 30 is secured to, or constitutes, the press head, which is held by suitable rods 31 rising from a base 32. An intermediate member 33 on this base supports the cylinder 23 referred to.

Secured to the platens 20 and 30 of the press, are suitable clamps adapted to hold the mold plates thereon. These clamps are shown as consisting of rotatable cams 40 mounted on pins 41 and provided with handles 42 so that they may turn into engagement with side ribs 14 on the mold plates.

In Figs. 1 and 2, 50 indicates a suitable upwardly opening box or receptacle adapted to surround the mold plates and make close connection at its upper edge with the head or platen 30, a suitable gasket 51 being shown as held by the upper platen to coact with the top of the box. This box is guided by ears 53 embracing the rods 31. The bottom of the box surrounds the plunger 20 and carries a stuffing box 55 to make an airtight connection therewith. Depending from the box are two or more plungers 56 which extend through stuffing boxes 57 into the cylinders 58, supported on the base 32 and conveniently made a part of the intermediate casting 33. These cylinders are adapted to be supplied with compressed fluid through a pipe 59 controlled by a valve 60.

61 indicates a pipe under the control of a valve 62 communicating with the box 50 and adapted to convey compressed air thereto, this pipe having a flexible connection with its supply conduit, so as not to interfere with the movement of the box 50. For simplicity, I have shown the valves 62, 60 and 24 as of the venting or draining type, so that they may provide for the escape of fluid from the respective chambers; but if desired, other valves may be provided for such escape.

With such an apparatus as described, a pair of mold plates 10 and 11 held together by clamps 15 and containing inflated rubber articles, are placed on the platen 20, the box 50 being at its lowermost position, as shown in Fig. 1, to enable convenient access to the platen. The clamps 40 carried by the platen 20 may be turned into engagement with the lower mold plate, to accurately position the mold plates. When the plates are thus positioned, hydraulic pressure is admitted to the cylinder 23 through the pipe 24, raising the plunger 21 until the upper mold plate is pressed firmly against the upper platen. When in this position the clamps 40, carried by the upper platen, are turned onto the ribs 14 of the upper mold plate, locking this plate to the upper platen. The upward pressure of the plunger will relieve the binding of the wedge clamps 15 sufficiently so that they may be conveniently removed by hand, and they are so removed, leaving the plates separable but held together by the hydraulic pressure in the cylinder 23.

When the plates have been unlocked, but are held together by hydraulic pressure, as described, pressure is admitted to the cylinders 58, raising the box 50 until its upper edge contacts with the gasket 51. Then while this pressure is maintained, the valve 62 is opened and compressed air or other fluid, admitted to the box 50. When a pressure approximately equal to the internal pressure in the rubber articles has been thus admitted, the valve 25 is opened, relieving the hydraulic pressure in the cylinder 23. The internal pressure in the articles, assisted by the weight of the lower mold plate, platen and plunger, is sufficient to start the separation of the molds. As soon as any separation takes place, the downward pressure of the air within the box 50, on top of the lower mold plate and platen, equalizes the upward pressure on the bottom of the platen, and thus there is an effective downward air pressure on the top of the plunger. This, together with the weight of the plunger, platen and mold, causes these parts to quickly descend.

Now, it should be noted in the above operation, that, as the mold plates start to separate, the compressed fluid within the box 50 enters between the mold plates and acts on the periphery of each article, thus preventing its internal pressure from bulging it into the space between the mold plates. As the plates separate this surrounding atmosphere acts on the articles and enters the cavities and reduces the size of the articles, so that they rest freely in the cavities of the lower mold plate. After the lower plate has descended and the articles are thus resting in the cavities of that plate, the air pressure is relieved in the box 50, and as this pressure drops the articles re-expand from their internal pressure, and this expansion forces them gradually out of the cavities so that they rest lightly on the edges of the cavities, as illustrated by the ball A in Fig. 4. Then the pressure is relieved from the cylinders 58 by opening the valve 60, whereupon the box 50 drops to the position shown in Fig. 1, and the articles, released and resting lightly on the lower mold plate, may be readily removed.

While my system, as described, is readily adapted for hollow inflated articles of various shapes, I regard it as sufficient to illustrate it with reference to hollow inflated rubber balls. Fig. 3 shows such a ball as completed by vulcanization and ready for removal, the ball in that case having two substantially hemispherical sections $a$, $a'$, united by a bevel joint $a^2$, as set out in my Patent No. 1,151,396 issued August 24, 1915. Fig. 4 illustrates in side elevation at A the same ball after it has expanded to its natural condition in air of atmospheric pressure. It will be understood that a considerable internal pressure will provide a very lively ball, well suited for athletic use. The same internal pressure, however, has sometimes caused trouble in removing the balls from their molds, as already explained, and it has been primarily to overcome that trouble that the present invention was developed.

Having thus described my invention, what I claim is:

1. The method of releasing elastic articles from mold cavities consisting of surrounding the articles with fluid under pressure and at the same time separating the mold sections, whereby the articles are prevented from concentrated bulging.

2. The method of releasing inflated articles from molds consisting of supplying the exterior of the articles with fluid under pressure at the time that the mold sections are being separated, and thereafter reducing such pressure.

3. The method of releasing hollow inflated articles from molds containing them, consisting of surrounding the molds by an atmosphere of fluid under pressure, and then separating the molds in such fluid.

4. The method of discharging hollow inflated articles from molds containing them, consisting of surrounding the molds by an atmosphere of fluid under pressure, then separating the molds in such fluid, then relieving the surrounding pressure, and then removing the released articles.

5. The method of releasing elastic articles from mold plates which have sets of coacting cavities, consisting of establishing a fluid pressure about such plates, then separating the plates, whereby such pressure is admitted between the plates to the exterior of the articles, and then relieving such external pressure.

6. The method of releasing hollow inflated elastic articles from superposed cavitary mold plates containing them, consisting of establishing a fluid pressure about the coacting mold plates, then separating the mold plates, whereby such pressure is admitted between the plates to the exterior of the articles, and reduces their size to make them lie freely in the lower plate, and then relieving such external pressure, whereby the articles may expand and rest lightly on the cavity of the lower plate.

7. The method of releasing an elastic article from a separable mold containing it, consisting of establishing a closed chamber about said mold, admitting compressed air to such chamber, separating the mold in such chamber in an atmosphere of such compressed air, relieving the surrounding air pressure, and then opening the chamber to enable external access to the released article.

8. The method of releasing vulcanized rubber inflated balls having an internal pressure from the cavities of mold plates containing such balls, consisting of establishing a closed chamber about the mold plates, admitting compressed air to such chamber, separating the mold plates in such chamber in an atmosphere of such compressed air, reducing the pressure of such encompassing atmosphere, and then opening the chamber to enable external access to the released balls.

9. In an apparatus of the character described, the combination with a stationary platen and a movable platen adapted to hold mold plates, of clamping devices carried by such platens comprising rotatably pivoted wedges provided with suitable operating handles, a box adapted to coact with the stationary platen to inclose the mold plates, means for moving the movable platen, and means for moving said box.

In testimony whereof, I hereunto affix my signature.

FRED THOMAS ROBERTS.